(12) United States Patent
Bleidorn et al.

(10) Patent No.: US 12,074,845 B2
(45) Date of Patent: *Aug. 27, 2024

(54) SYSTEM AND METHOD FOR REMOTELY FILTERING NETWORK TRAFFIC OF A CUSTOMER PREMISE DEVICE

(71) Applicant: Charter Communications Operating, LLC, St. Louis, MO (US)

(72) Inventors: Timothy Bleidorn, Colorado Springs, CO (US); Cheryl Warne, Lone Tree, CO (US); Shane Newberg, Aurora, CO (US); Christopher Teague, Highlands Ranch, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/110,172

(22) Filed: Feb. 15, 2023

(65) Prior Publication Data
US 2023/0198939 A1 Jun. 22, 2023

Related U.S. Application Data

(63) Continuation of application No. 17/356,710, filed on Jun. 24, 2021, now Pat. No. 11,641,341, which is a (Continued)

(51) Int. Cl.
*H04L 61/5014* (2022.01)
*H04L 12/66* (2006.01)
(Continued)

(52) U.S. Cl.
CPC .......... *H04L 61/5014* (2022.05); *H04L 12/66* (2013.01); *H04L 47/70* (2013.01); *H04L 61/35* (2013.01); *H04L 2101/618* (2022.05)

(58) Field of Classification Search
CPC ..... H04L 61/5014; H04L 61/35; H04L 12/66; H04L 47/70; H04L 47/83; H04L 2101/618
See application file for complete search history.

(56) References Cited

U.S. PATENT DOCUMENTS 8,072,973 B1 12/2011 Kotha et al.
8,425,852 B2 4/2013 Matsuuchi et al.
(Continued)

*Primary Examiner* — Stephen J Clawson
(74) *Attorney, Agent, or Firm* — THE MARBURY LAW GROUP, PLLC

(57) ABSTRACT

Systems, methods, and devices for performing targeted filtering of network traffic generated by user equipment (UE) devices connected to a customer premise equipment (CPE) device in a communication system that includes a distributed residential gateway. A network server may determine that the communication system includes a UE device that is compromised, misconfigured, or operating outside normal communication parameters, identify the UE device, determine an Internet protocol (IP) address or a media access control (MAC) address of the identified UE device, generate a quarantine request message that includes the IP address or the MAC address of the identified UE device in response to determining that the preconfigured virtual local area network access control list (VACL) on the CPE lists source IP addresses from which the CPE will filter outbound traffic, and send the generated quarantine request message to a bridged residential gateway (BRG) associated with the CPE device.

27 Claims, 7 Drawing Sheets

Related U.S. Application Data continuation of application No. 16/245,423, filed on Jan. 11, 2019, now Pat. No. 11,075,877.

(51) Int. Cl.
*H04L 47/70* (2022.01)
*H04L 61/00* (2022.01)
*H04L 101/618* (2022.01)

(56) References Cited

U.S. PATENT DOCUMENTS

| | | |
|---|---|---|
| 8,584,194 B1 | 11/2013 | Kerr et al. |
| 8,775,629 B1 | 7/2014 | Whittle |
| 10,193,753 B1 | 1/2019 | Tabet et al. |
| 2004/0193867 A1 | 9/2004 | Zimmer et al. |
| 2005/0114341 A1 | 5/2005 | Droms |
| 2005/0131997 A1* | 6/2005 | Lewis ............... H04L 63/10 709/203 |
| 2006/0031921 A1 | 2/2006 | Danforth et al. |
| 2006/0075140 A1 | 4/2006 | Sobel et al. |
| 2009/0041011 A1 | 2/2009 | Sheppard |
| 2010/0299173 A1 | 11/2010 | Zampiello et al. |
| 2017/0195162 A1 | 7/2017 | Enrique Salpico |
| 2020/0153846 A1 | 5/2020 | Srivastava et al. |

* cited by examiner

SYSTEM AND METHOD FOR REMOTELY FILTERING NETWORK TRAFFIC OF A CUSTOMER PREMISE DEVICE

RELATED APPLICATIONS

This application is a continuation of U.S. patent application Ser. No. 17/356,710 filed Jun. 24, 2021 entitled "System And Method For Remotely Filtering Network Traffic Of A Customer Premise Device" which claims priority to U.S. patent application Ser. No. 16/245,423 filed Jan. 11, 2019 entitled "System And Method For Remotely Filtering Network Traffic Of A Customer Premise Device," the contents of which is hereby incorporated by reference in its entirety.

BACKGROUND

Many subscribers connect to the Internet via a customer premise equipment (CPE) device, which often includes a residential gateway (RG) and modem that together provide network connectivity to home or small office network. In particular, the RG device (sometimes referred to as a "home router") allows user equipment (UE) devices to form a local area network (LAN). In addition, the modem provided with the RG in the CPE allows UE devices connected to the CPE to further connect to a wide area network (WAN) including the Internet.

Traditional CPE devices are inexpensive networking devices that are designed to provide connectivity to a small number of UE devices in a home or small office. As such, these CPE devices only have a small fraction of the processing and computing capabilities of the network-based gateways and routers deployed within the service provider network. Consequently, traditional CPE devices cannot provide the robust inventory of features that may be supported by network-based gateways and routers deployed within the service provider network.

Recently, it has become common for a single subscriber to employ multiple personal devices simultaneously (e.g., a smartphone, a tablet, a laptop computer, a smart watch, a gaming system, a smart TV, etc.). In addition, many homes and small business now include smart and internet-of-things (IoT) devices that require network connectivity and employ machine-to-machine (M2M) communications in which information is exchanged with other systems and devices without human interaction. Such smart/IoT devices may include, but are not limited to, medical devices, security cameras, gaming consoles, clocks, speakers, lights, door bells, cameras, thermostats, HVAC systems, and other similar "smart home" devices. These smart/IoT devices are similar to more conventional computing devices in that they include a processor, memory, communication circuitry, and access to the local area network (LAN) and/or the Internet. However, unlike conventional computing devices, these smart/IoT devices typically are not protected by anti-virus/anti-malware software. As a result, these smart/IoT devices are becoming the preferred gateway targets for hackers, thieves, and other malicious actors seeking to launch malware attacks, gain remote control of a device, steal private or sensitive information, or engage in other nefarious activities. These smart/IoT devices often may provide the gateway for malicious actors to access both LANs and WANs to implement malicious code and software.

Due to the increasing number of smart/IoT and other devices that require network connectivity, the vulnerability of IoT and "smart home" devices, the rapid development new types of malware and cyber-attacks, and the private or sensitive nature of the data that is now being collected and communicated by these smart/IoT devices, network service providers are increasingly implementing services and security solutions on the CPE devices. However, since CPE devices are inexpensive networking devices with only a small fraction of the processing and computing capabilities of network-based devices, implementing effective solutions on the CPE device may require the use of expensive hardware and frequent software updates. Accordingly, improved network and security solutions that allow for the continued use of relatively inexpensive hardware CPE devices will be beneficial to consumers and network service providers.

SUMMARY

The various aspects include methods of performing targeted filtering of network traffic generated by user equipment (UE) devices connected to a customer premise equipment (CPE) device in a communication system that includes a distributed residential gateway, which may include identifying a UE device in a local area network (LAN) associated with the CPE that is compromised, misconfigured, or operating outside normal communication parameters, sending a dynamic host configuration protocol (DHCP) force renew message via a wide area network (WAN) to the identified UE device in the LAN, generating a DHCP offer message that presents a new Internet protocol (IP) address assignment that is within a range of IP addresses included in a layer 2/3 access list, and sending the generated DHCP offer message to the UE device to quarantine the UE device.

In an aspect, sending the generated DHCP offer message to the UE device to quarantine the UE device may include sending the generated DHCP offer message to quarantine the UE device at a LAN-interface of the CPE. In a further aspect, sending the generated DHCP offer message to the UE device to quarantine the UE device may include sending the generated DHCP offer message to quarantine the UE device at a WAN-interface of the CPE. In a further aspect, generating the DHCP offer message that presents the new IP address assignment within the range of IP addresses included in the layer 2/3 access list may include generating the DHCP offer message to presents the new IP address assignment to be within the range of IP addresses included in at least one of a layer 2 access list, or a layer 3 access list. In a further aspect, generating the DHCP offer message that presents the new IP address assignment within the range of IP addresses included in the layer 2/3 access list may include generating the DHCP offer message to presents the new IP address assignment to be within the range of IP addresses included in at least one of a blocked IP list, or a drop IP list.

In a further aspect, the functions of the CPE may be distributed between a bridged residential gateway (BRG) at a customer premise and a broadband network gateway (BNG) in a service provider network. In a further aspect, the functions of the CPE that are distributed between the BRG at the customer premise and the BNG in the service provider network include a DHCP server function, and a packet filter function. In a further aspect, sending the generated DHCP offer message to the UE device to quarantine the UE device may include accomplishing targeted filtering of host traffic at the CPE for complete host isolation. In a further aspect, sending the generated DHCP offer message to the UE device to quarantine the UE device may include accomplishing targeted filtering of host traffic at the CPE for partial host isolation.

Further aspects include a server computing device that includes a processor configured with processor-executable instructions to identify a user equipment (UE) device in a local area network (LAN) that is associated with a customer premise equipment (CPE) device and is at least one of compromised, misconfigured, or operating outside normal communication parameters, send a dynamic host configuration protocol (DHCP) force renew message via a wide area network (WAN) to the identified UE device in the LAN, generate a DHCP offer message that presents a new Internet protocol (IP) address assignment that is within a range of IP addresses included in a layer 2/3 access list, and send the generated DHCP offer message to the UE device to quarantine the UE device.

In an aspect, the processor may be configured to send the generated DHCP offer message to the UE device to quarantine the UE device by sending the generated DHCP offer message to quarantine the UE device at a LAN-interface of the CPE. In a further aspect, the processor may be configured to send the generated DHCP offer message to the UE device to quarantine the UE device by sending the generated DHCP offer message to quarantine the UE device at a WAN-interface of the CPE. In a further aspect, the processor may be configured to generate the DHCP offer message that presents the new IP address assignment within the range of IP addresses included in the layer 2/3 access list by generating the DHCP offer message to presents the new IP address assignment to be within the range of IP addresses included in at least one of a layer 2 access list, or a layer 3 access list. In a further aspect, the processor may be configured to generate the DHCP offer message that presents the new IP address assignment within the range of IP addresses included in the layer 2/3 access list by generating the DHCP offer message to presents the new IP address assignment to be within the range of IP addresses included in at least one of a blocked IP list, or a drop IP list.

In a further aspect, the processor may be configured to identify the UE device in the LAN associated with the CPE by identifying a UE device in a LAN associated with a CPE having functions that are distributed between a bridged residential gateway (BRG) at a customer premise and a broadband network gateway (BNG) in a service provider network. In a further aspect, the processor may be configured to identify the CPE having functions that are distributed between the BRG at the customer premise and the BNG in the service provider network by identifying a CPE having distributed functions that include a DHCP server function, and a packet filter function. In a further aspect, the processor may be configured to send the generated DHCP offer message to the UE device to quarantine the UE device to accomplish complete host isolation. In a further aspect, the processor may be configured to send the generated DHCP offer message to the UE device to quarantine the UE device to accomplish partial host isolation.

Further aspects may include non-transitory computer readable storage medium having stored thereon processor-executable software instructions configured to cause a server processor to perform operations for accomplishing targeted filtering of network traffic generated by user equipment (UE) devices connected to a customer premise equipment (CPE) device in a communication system that includes a distributed residential gateway, the operations including identifying a UE device in a local area network (LAN) associated with the CPE that is compromised, misconfigured, or operating outside normal communication parameters, sending a dynamic host configuration protocol (DHCP) force renew message via a wide area network (WAN) to the identified UE device in the LAN, generating a DHCP offer message that presents a new Internet protocol (IP) address assignment that is within a range of IP addresses included in a layer 2/3 access list, and sending the generated DHCP offer message to the UE device to quarantine the UE device.

In an aspect, the stored processor-executable software instructions may be configured to cause a processor to perform operations such that sending the generated DHCP offer message to the UE device to quarantine the UE device includes sending the generated DHCP offer message to quarantine the UE device at a LAN-interface of the CPE. In a further aspect, the stored processor-executable software instructions may be configured to cause a processor to perform operations such that sending the generated DHCP offer message to the UE device to quarantine the UE device includes sending the generated DHCP offer message to quarantine the UE device at a WAN-interface of the CPE.

In a further aspect, the stored processor-executable software instructions may be configured to cause a processor to perform operations such that generating the DHCP offer message that presents the new IP address assignment within the range of IP addresses included in the layer 2/3 access list includes generating the DHCP offer message to presents the new IP address assignment to be within the range of IP addresses included in at least one of a layer 2 access list, or a layer 3 access list. In a further aspect, the stored processor-executable software instructions may be configured to cause a processor to perform operations such that generating the DHCP offer message that presents the new IP address assignment within the range of IP addresses included in the layer 2/3 access list includes generating the DHCP offer message to presents the new IP address assignment to be within the range of IP addresses included in at least one of a blocked IP list, or a drop IP list.

In a further aspect, the stored processor-executable software instructions may be configured to cause a processor to perform operations such that identifying the UE device in the LAN associated with the CPE includes identifying a UE device in a LAN associated with a CPE having functions that are distributed between a bridged residential gateway (BRG) at a customer premise and a broadband network gateway (BNG) in a service provider network. In a further aspect, the stored processor-executable software instructions may be configured to cause a processor to perform operations such that identifying the CPE having functions that are distributed between the BRG at the customer premise and the BNG in the service provider network include identifying a CPE having distributed functions that include a DHCP server function, and a packet filter function.

In a further aspect, the stored processor-executable software instructions may be configured to cause a processor to perform operations such that sending the generated DHCP offer message to the UE device to quarantine the UE device includes accomplishing targeted filtering of host traffic at the CPE for complete host isolation. In a further aspect, the stored processor-executable software instructions may be configured to cause a processor to perform operations such that sending the generated DHCP offer message to the UE device to quarantine the UE device includes accomplishing targeted filtering of host traffic at the CPE for partial host isolation.

Further aspects may include a server computing device having means for identifying a user equipment (UE) device in a local area network (LAN) that is associated with a customer premise equipment (CPE) device and at least one of compromised, misconfigured, or operating outside normal communication parameters means for sending a dynamic host configuration protocol (DHCP) force renew message via a wide area network (WAN) to the identified UE device in the LAN, means for generating a DHCP offer message that presents a new Internet protocol (IP) address assignment that is within a range of IP addresses included in a layer 2/3 access list, and means for sending the generated DHCP offer message to the UE device to quarantine the UE device. In an aspect, the means for sending the generated DHCP offer message to the UE device to quarantine the UE device include means for sending the generated DHCP offer message to quarantine the UE device at a LAN-interface of the CPE. In a further aspect, the means for sending the generated DHCP offer message to the UE device to quarantine the UE device include means for sending the generated DHCP offer message to quarantine the UE device at a WAN-interface of the CPE.

In a further aspect, the means for generating the DHCP offer message that presents the new IP address assignment within the range of IP addresses included in the layer 2/3 access list includes means for generating the DHCP offer message to present the new IP address assignment to be within the range of IP addresses included in at least one of a layer 2 access list, or a layer 3 access list. In a further aspect, the means for generating the DHCP offer message that presents the new IP address assignment within the range of IP addresses included in the layer 2/3 access list includes means for generating the DHCP offer message to present the new IP address assignment to be within the range of IP addresses included in at least one of a blocked IP list, or a drop IP list.

In a further aspect, the means for identifying the UE device in the LAN associated with the CPE include means for identifying a UE device in a LAN associated with a CPE having functions that are distributed between a bridged residential gateway (BRG) at a customer premise and a broadband network gateway (BNG) in a service provider network. In a further aspect, means for identifying the CPE having functions that are distributed between the BRG at the customer premise and the BNG in the service provider network include means for identifying a CPE having distributed functions that include a DHCP server function, and a packet filter function. In a further aspect, the means for sending the generated DHCP offer message to the UE device to quarantine the UE device include means for sending the generated DHCP offer message to the UE device to accomplish complete host isolation. In a further aspect, the means for sending the generated DHCP offer message to the UE device to quarantine the UE device include means for sending the generated DHCP offer message to the UE device to accomplish partial host isolation.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

Figure 1A:
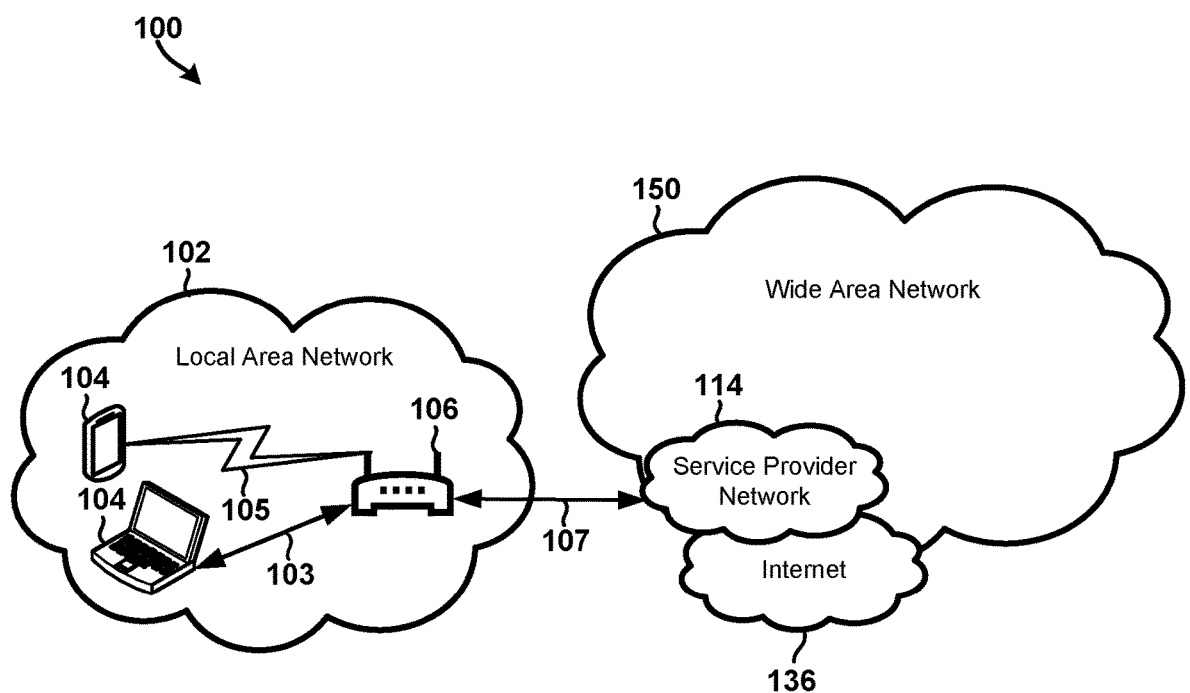
FIG. 1A is a block diagram of an example system that includes a local area network and a wide area network that suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The term "service provider network" is used generically herein to refer to any network suitable for providing consumers with access to the Internet or IP services over broadband connections, and may encompass both wired and wireless networks/technologies. Examples of wired network technologies and networks that may be included within a service provider network include cable networks, fiber optic networks, hybrid-fiber-cable networks, Ethernet, local area networks (LAN), metropolitan area networks (MAN), wide area networks (WAN), networks that implement the data over cable service interface specification (DOCSIS), networks that utilize asymmetric digital subscriber line (ADSL) technologies, etc. Examples of wireless network technologies and networks that may be included within a service provider network include third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), high-speed downlink packet access (HSDPA), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), Bluetooth®, land mobile radio (LMR), and integrated digital enhanced network (iden). Each of these wired and wireless technologies involves, for example, the transmission and reception of data, signaling and/or content messages.

Any references to terminology and/or technical details related to an individual wired or wireless communications standard or technology are for illustrative purposes only, and not intended to limit the scope of the claims to a particular communication system or technology unless specifically recited in the claim language.

The term "user equipment (UE)" may be used herein to refer to any one or all of satellite or cable set top boxes, laptop computers, rack mounted computers, routers, cellular telephones, smart phones, personal or mobile multi-media players, personal data assistants (PDAs), customer-premises equipment (CPE), personal computers, tablet computers, smart books, palm-top computers, desk-top computers, wireless electronic mail receivers, multimedia Internet enabled cellular telephones, wireless gaming controllers, streaming media players (such as, ROKU™), smart televisions, digital video recorders (DVRs), modems, routers, network switches, residential gateways (RG), access nodes (AN), bridged residential gateway (BRG), fixed mobile convergence products, home networking adapters and Internet access gateways that enable consumers to access communications service providers' services and distribute them around their house via a local area network (LAN), and similar electronic devices which include a programmable processor and memory and circuitry for providing the functionality described herein.

The terms "component," "system," and the like may be used herein to refer to a computer-related entity (e.g., hardware, firmware, a combination of hardware and software, software, software in execution, etc.) that is configured to perform particular operations or functions. For example, a component may be, but is not limited to, a process running on a processor, a processor, an object, an executable, a thread of execution, a program, and/or a computing device. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

Many subscribers connect to the Internet via a customer premise equipment (CPE) component/device. A CPE device may include a cable modem, digital subscriber line modem, router, switch, firewall, packet filter, wireless access point, and/or a residential gateway that provide network connectivity to home or small office network. In particular, a CPE device may allow UE devices on the local area network (LAN) to connect to a wide area network (WAN) and ultimately the Internet. A CPE may include LAN ports (e.g., ports FE0-FE3, etc.) and a LAN-interface for communicating with the UE devices within the local network. The CPE may include a WAN port (e.g., port FE4, etc.) and a WAN-interface that allows the UE devices to communicate with devices outside of the local network.

The dynamic host configuration protocol (DHCP) is a network management protocol used on UDP/IP networks whereby a DHCP server dynamically assigns an IP address and other network configuration parameters to each UE device on the LAN so they can communicate with other IP networks on the WAN. A CPE may include a DHCP server that enables UE devices to request IP addresses and networking parameters automatically from the service provider, thereby reducing the need for a network administrator or a user to manually assign the IP addresses to the UE devices.

The DHCP server (e.g., within the CPE device, etc.) may store IP addresses and information about client configuration parameters such as default gateway, domain name, the name servers, time servers, MAC addresses, hostnames, etc. When a UE device requests to establish a connection to the LAN (e.g., after booting, etc.) serviced by the CPE, the UE device broadcasts a DHCP query for network information. The DHCP server services the request by sending network and lease information to that UE device. The network information may include a network address (e.g., an IP address, etc.) that is necessary for that UE device to connect to the network. The lease information may identify a time period after which the network information will no longer be valid. The UE device may request to renew or extend the lease, and the DHCP server may assign the device the same or different address each time the lease is renewed. Per standards (i.e., Network Working Group Request for Comments: 2131), the UE device attempts to renew or extend its lease halfway through the lease period.

In addition to a DHCP server, the CPE device may include a packet filter that allows, rejects, or drops IP packets to or from a UE device in the LAN based on one or more filtering rules. The filtering rules may specify that the CPE allow, reject, or drop IP packets based on the source and/or destination IP addresses, port numbers, protocols, or other similar network information. By including a packet filter within the CPE device and using filtering rules to determine whether to allow, reject or drop IP packets to or from a UE device in the LAN, the CPE device may help prevent the propagation of malicious or unwanted traffic throughout the WAN (e.g., service provider network, Internet, etc.).

Over the past several years, the CPE has evolved from a simple connectivity device to a complex and feature rich computing device. Many different CPE types and models have been deployed over the years, and older models often do not have sufficient hardware or software resources to support the most recent and robust features demanded by today's customers. As a result, the addition of such features or services may require customers to obtain a new CPE. Such equipment updates are often an extremely slow and prohibitively expensive process. Accordingly, there is a need for an improved system architecture that allows for the rapid deployment of new features or services at the customer premises without requiring complex software or expensive hardware updates to existing CPEs.

The virtual customer premises equipment (vCPE) or network enhanced residential gateway (NERG) architectures are proposed solutions that allow for the rapid deployment of new features or services to be available at the customer premises without requiring the CPE to include complex software or expensive hardware. For example, vCPE sets forth a distributed residential gateway architecture in which the functions of the CPE (e.g., DHCP server, packet filter, etc.) are distributed between a bridged residential gateway (BRG) at the customer premises and a broadband network gateway (BNG) in the service provider network.

The vCPE architecture allows for offloading many of the functions and services of the CPE to the BNG, thereby allowing the CPE to operate as a simple connectivity device, while still providing the end user with the desired/demanded rich and robust feature and service set. While there are many benefits associated with using a vCPE architecture, vCPE architecture does not allow for targeted filtering of host traffic at the CPE component. Rather, within the vCPE architecture, filtering is provided only at the BNG.

As mentioned above, targeted filtering of host traffic is necessary to prevent propagation of malicious or unwanted traffic throughout the WAN or service provider network. The ability to filter at the CPE facilitates the mitigation of offending traffic and provides a means for protecting the WAN facing interface as well as the other UE devices connected to LAN via the CPE. In contrast, when filtering is provided only at the BNG (as with the vCPE architecture), the WAN interface can become compromised via saturation of the upstream path, effectively isolating the entire CPE and all its connected UE device from the WAN. In addition, when filtering is provided only at the BNG, it becomes challenging or impossible to accomplish targeted filtering of host traffic (e.g., IP packets sent by a specific UE device in the LAN, etc.) for complete or partial host isolation at the LAN or WAN interfaces without negatively impacting other connected UE devices.

The various embodiments disclosed herein overcome these technical challenges associated with using a vCPE architecture while still providing desired targeted filtering. The various embodiments utilize the vCPE or distributed residential gateway architecture, yet allow targeted filtering of host traffic at the CPE for complete or partial host isolation at the LAN and/or WAN interfaces. By utilizing the vCPE distributed residential gateway architecture, the various embodiments allow for the rapid deployment of new features or services at the customer premises without requiring complex software or expensive hardware on the CPEs. By allowing targeted filtering of host traffic at the CPE, the various embodiments allow for isolating a specific host without negatively impacting all the devices within the device's LAN or home network.

For these and other reasons, the various embodiments reduce the costs associated with the deployment of new features or services at the customer premises, and improve the performance, efficiency and functioning of the service provider network and the components/devices that are included in, utilize, or benefit from the service provider network. Other improvements to performance and functioning of the communication system and its constituent network components will be evident from the disclosures below.

FIG. 1A is a simplified example of a network 100 that may be used to implement the various embodiments. In the example illustrated in FIG. 1A, the network 100 includes a local area network (LAN) 102 and a wide area network (WAN) 150. The LAN 102 includes user equipment (UE) 104 devices coupled to a customer premise equipment (CPE) 106 component/device via wired 103 and wireless 105 communication links. The CPE 106 includes communication links 107 to a service provider network 114 within the WAN 150 that allow the UE 104 devices to send and receive information to and from the Internet 136.

Figure 1B:
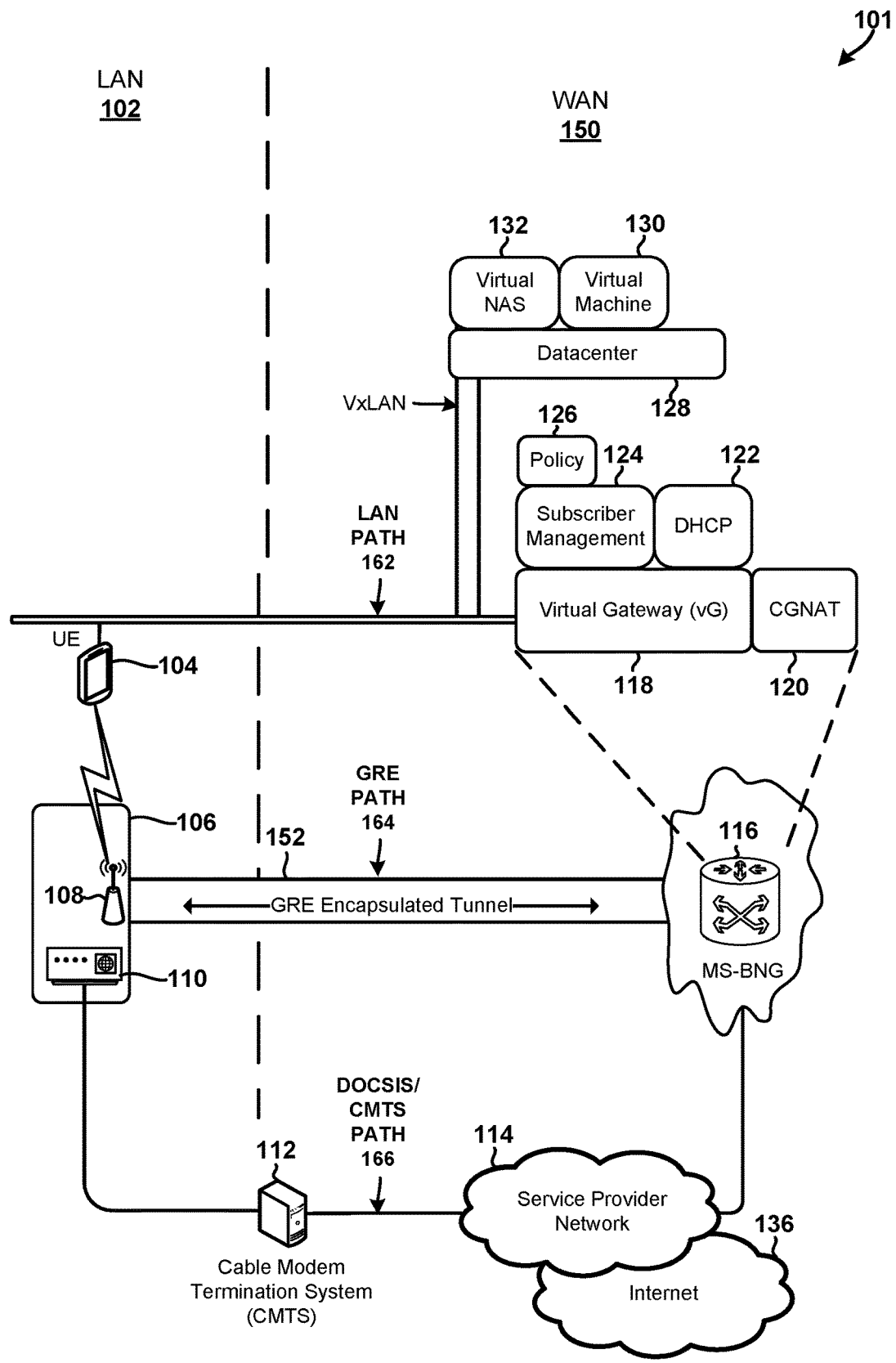
FIG. 1B is a block diagram of a system that includes a distributed residential gateway architecture in accordance with the various embodiments.

FIG. 1B illustrates a network 101 that implements a distributed residential gateway architecture that suitable for use in implementing the various embodiments.

In the example, illustrated in FIG. 1B, the network includes a LAN 102, a UE 104 device, a CPE 106, a bridged residential gateway (BRG) 108, a cable modem (CM) 110, a digital subscriber line access multiplexer (DSLAM) or a cable modem termination system (CMTS) 112, a service provider network 114, an MS-BNG 116 component, a Virtual Gateway (vG) 118 component, a carrier-grade network address translation (CGNAT) 120 component, a DHCP 122 component, a subscriber management 124 component, a policy 126 component, a datacenter 128 component, a virtual machine 130 component, and a virtual network-attached storage (NAS) 132 component. Communications may be facilitated via a generic routing encapsulation (GRE) tunnel 152, local area network (LAN) links, Virtual Extensible LAN (VXLAN) links, and other wired or wireless communication links. A GRE path 164 may be carried within a DOCSIS path 166, and a LAN path 162 may be within the GRE path 164.

Conventional CPE functions (e.g., DHCP, NAT, firewall, etc.) may be distributed between the BRG 108 in LAN 102 and the MS-BNG 116 or vG 118 in the WAN 150. For example, unlike conventional solutions that provide DHCP server functionally locally in the LAN 102 via CPE modem/router, the network 101 includes a DHCP 122 component in the WAN 150. Moving such functions from the LAN 102 onto the WAN 150 allows the CPE 106 component to operate as a simple connectivity device that allows the UE 104 to connect to information and resources on the WAN 150.

The MS-BNG 116 component may be configured to facilitate communications with the CPE 106 component via the GRE encapsulated tunnel 152. The MS-BNG 116 component and the CPE 106 component may create a logical subscriber link (LSL) between the BRG 108 component and the vG 118 component.

The CM 110 may be a network bridge that provides bi-directional data communication via radio frequency channels on a hybrid fiber-coaxial (HFC) and/or radio frequency over glass (RFoG) infrastructure. The CMTS 112 component may be deployed in a headend or hubsite, and configured to facilitate high speed communications between the CM 110 and the components within the service provider network 114. The service provider network 114 may include various network components for providing consumers with access to the Internet 136 or IP services over broadband connections.

The UE 104 communications may be carried over the GRE encapsulated tunnel 152 via an extended LAN. The GRE encapsulated tunnel 152 may depend on the DOCSIS/CMTS path to egress the residence, home network or LAN 102.

The CGNAT 120 component may be configured to translate private-to-private IP addresses and private-to-public IP addresses. The CGNAT 120 may translate private IP address of the UE 104 component into public IP addresses to allow multiple customer networks to share a common public IP address.

The DHCP 122 component may be an independent platform (with the MS-BNG 116 operating as a DHCP relay) or may be hosted by or within the MS-BNG 116. The DHCP 122 component may be configured to dynamically assign an IP address to each UE 104 device as part of a lease assignment. The DHCP 122 component may send the IP address and other network configuration parameters to each UE 104 device via the BRG 108. The UE 104 device may utilize the assigned IP address to connect to the LAN 102 (and ultimately WAN 150) and communicate with other devices (e.g., other UE devices on the LAN 102, network servers on the WAN 150, etc.) for a time period identified by the lease (lease period). The UE 104 device may be configured to issue a request to renew or extend its lease assignment halfway through the lease period. In response, the DHCP 122 component may assign the UE 104 device the same or different address IP address as part of a lease renewal or extension.

The subscriber management 124 component may store subscriber information and/or perform various subscription management operations. The policy 126 component may be configured to determine and/or enforce various rules and policy decisions. The datacenter 128 component, virtual machine 130 component, and virtual NAS 132 component may provide a commodity hardware and a secure computing infrastructure for hosting the MS-BNG 116 or vG 118 components. These components may be used for hosting specialized services available to the customer as an extension of their home LAN 102.

Figure 2:
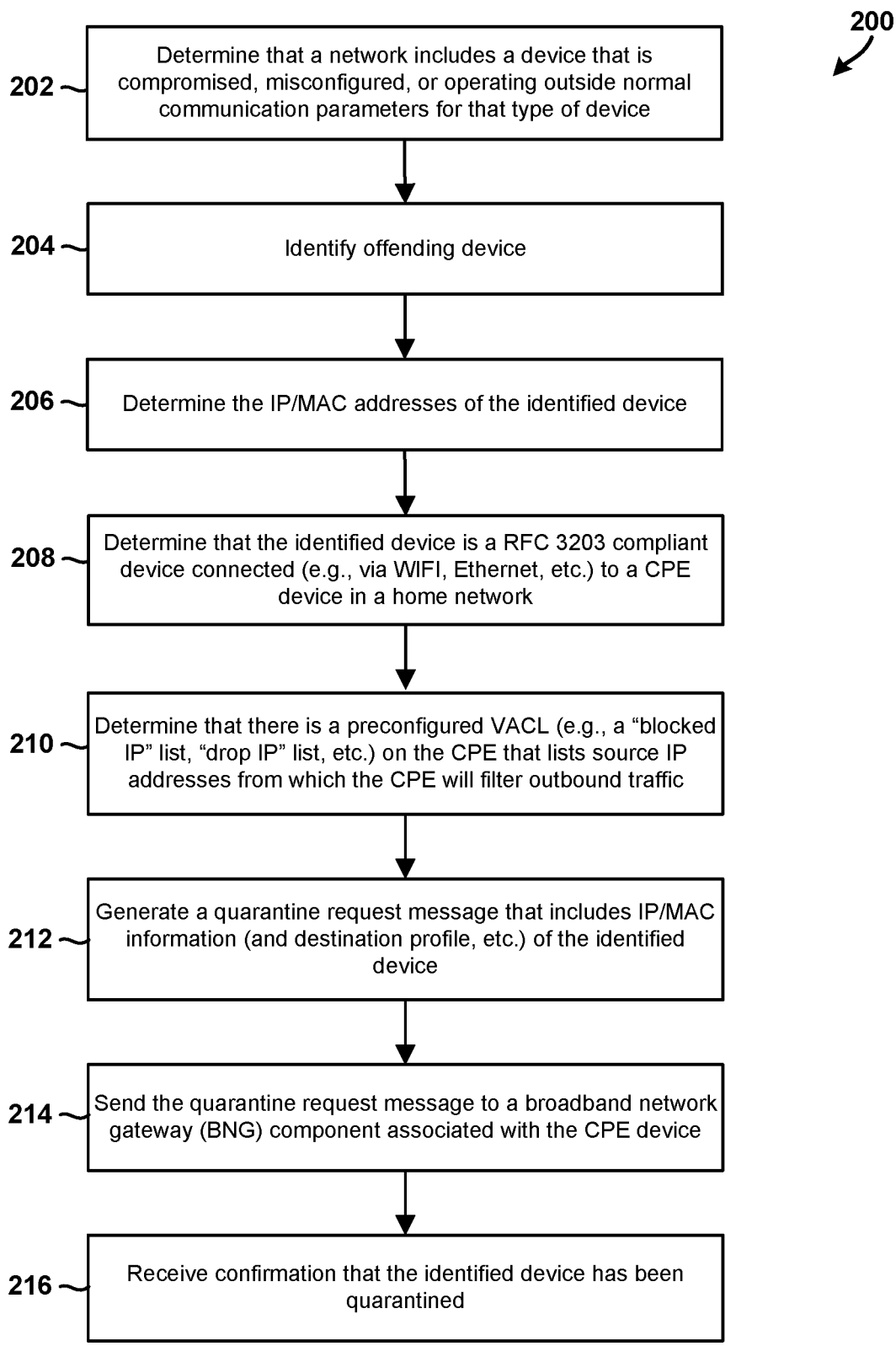
FIG. 2 is a process flow diagram that illustrates a method for determining whether to perform targeted filtering of network traffic generated by user equipment devices at an interface (e.g., LAN interface, WAN interface, etc.) of a customer premise equipment device in accordance with the various embodiments.

FIG. 2 illustrates a method 200 for determining whether to target filter network traffic at the CPE in accordance with the various embodiments. Method 200 may be performed via a processor of a computing system (e.g., security server computing device, etc.) that is deployed in the network (e.g., the service provider network 114, WAN 150, etc.) in order to determine whether the requirements or preconditions for targeted filtering of network traffic at the CPE are met. In some embodiments, all or portions of method 200 may be performed by a processor of a computing device that is included in a security, mediation, control, identification, tracking or trending system. In some embodiments, all or portions of method 200 may be performed by a processor in a computing system that implements all or portions of the MS-BNG component, CPE component, or UE component.

In block 202, the processor (e.g., of the computing device that is included in a security, mediation, control, identification, tracking or trending system, of the computing device that implements the MS-BNG component, etc.) may monitor user inputs, network traffic and/or device behaviors, and determine that a network (e.g., LAN 102 illustrated in FIGS. 1A and 1B, etc.) or a device within the network (e.g., one of the UEs 104 illustrated in FIGS. 1A and 1B, etc.) is compromised, misconfigured, or operating outside normal communication parameters for that type of device. In block 204, the processor may perform various operations to identify the local network (e.g., LAN 102 illustrated in FIGS. 1A and 1B, etc.) and offending device (e.g., UE 104 device in FIGS. 1A and 1B, etc.). In block 206, the processor may determine the IP and/or MAC addresses of the identified offending device. In block 208, the processor may determine that the identified offending device is a RFC 3203 compliant device that is connected to a CPE device (e.g., CPE 106 component illustrated in FIG. 1).

In block 210, the processor may determine that there is a preconfigured virtual local area network access control list (VACL) on the CPE that lists source IP addresses or ranges of addresses from which the CPE will filter (e.g., restrict, block, drop, etc.) outbound traffic. Said another way, in block 210, the processor may determine that the CPE component includes a blocked IP list, a drop IP list, a restricted IP list, a layer 2 access list, a layer 3 access list, a layer 2/3 access list, an in-home only access list, LAN filter list, WAN filter list, etc. In some embodiments, the layer 2/3 access list may identify a range of IPs for which OSI layer 2 and 3 communications with other UE devices connected to the LAN interface will be prevented. In some embodiments, the drop IP list may be similar to the layer 2/3 access list, except that a CPE component will allow connections from IP/MAC address addresses included in the "drop IP" list to continue communicating with other UE devices connected to the LAN interface, but not through the WAN interface.

In block 212, the processor may generate a quarantine request message that includes IP/MAC information and applicable destination profile of the identified device. In block 214, the processor may generate send the quarantine request message to a BNG component (e.g., MS-BNG 116 component illustrated in FIG. 1) that is associated with the CPE device. In block 216, the processor may receive confirmation that that identified device has been quarantined by assigning the identified offending device an IP address from the layer 2/3 access list (or the blocked IP list, drop IP list, etc.).

It should be noted that the CPE associated with the device (e.g., the wireless access point in the LAN to which the UE connects, etc.) does not participate in the control plane application of the quarantine. Indeed, the CPE may remain unaware of the state (Quarantined/Not Quarantined) of any UE at any point in time. Rather, the state of the UEs may be monitored and maintained via the BNG component (e.g., MS-BNG 116 component illustrated in FIG. 1).

Figure 3:
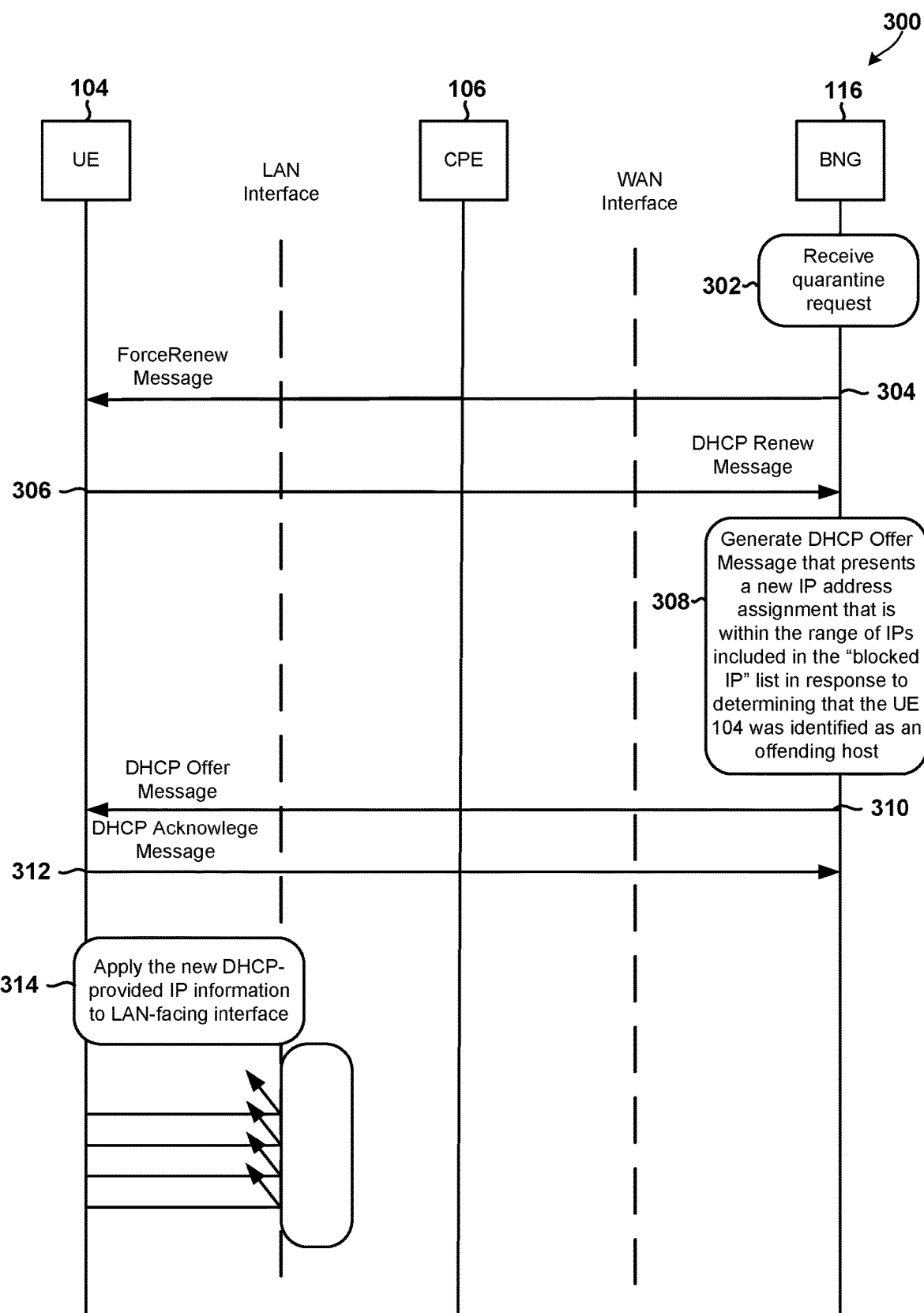
FIG. 3 is a process flow diagram that illustrates a method of filtering network traffic at a LAN interface in accordance with an embodiment.

FIG. 3 illustrates a method 300 of remotely filtering network traffic at the local area network interface of the CPE in accordance with an embodiment. Method 300 may be performed in a network or system that includes a BNG 116 component, a CPE 106 component, and a UE 104 device. In some embodiments, method 300 may be performed after the operations in block 214 illustrated in FIG. 2. The embodiment illustrated in FIG. 3 quarantines an identified offending UE device 104 from all other devices connected to the LAN or to other devices connected through a WAN/Internet.

In operation block 302, the BNG 116 component may receive a request to quarantine the UE 104 device in response to determining that the requirements or preconditions for targeted filtering of network traffic at the CPE are met. In some embodiments, the BNG 116 component may receive the quarantine request from a web server or customer web-portal that received user input indicating that the UE 104 should be quarantined. In some embodiments, the BNG 116 component may receive the quarantine request from a security, mediation, control, identification, tracking or trending system.

In some embodiments, the BNG 116 component may be configured to modify a policy of the active UE session in operation block 302. In some embodiments, the system issuing the quarantine request (e.g., web server, customer web-portal, etc.) may update the subscriber management 124 system (illustrated in FIG. 1B) to set a UE access policy associated with the UE 104 device to "quarantine" to provide persistence. In an embodiment, the BNG 116 component and/or the system issuing the quarantine request may add the IP and/or MAC address of the UE 104 device to a list (e.g., list of offending devices, etc.) stored in a local memory or remote memory.

In operation 304, the BNG 116 component may generate and send a DHCP ForceRenew Message to the UE 104 device. Since the BNG 116 component functions as the DHCP server, the DHCP ForceRenew Message may be issued directly to the UE 104 device such that it is not proxied through the CPE (although the system may use the CPE 106 for transport in some embodiments). In some embodiments, the CPE may passively maintain DHCP mapping of UE MAC to IP bindings in order to act as a backup DHCP server in the event that the WAN connection goes down.

In some embodiments, the BNG 116 component may generate and send the ForceRenew Message in response to determining that the UE 104 device is compromised, misconfigured, or operating outside normal communication parameters, and the preconditions for filtering network traffic at the CPE have been met. For example, the BNG 116 component may generate and send the DHCP ForceRenew Message in response to receiving information indicating that the UE 104 is a smart doorbell that has requested to open an IP tunnel to a server in a foreign country, and that such operations are not within the normal operating parameters of smart doorbell devices. Similarly, the BNG 116 component may generate and send the ForceRenew Message in response to receiving information that indicates that an uncharacteristically large amount of network traffic has originated from the UE 104, that the UE 104 participating in a DOS attack, that the UE 104 is engaging in activities typically associated with malware or bots, etc.

In some embodiments, as part of operation 304, the CPE 106 and/or UE 104 may perform various operations to purge the current DHCP-Provided IP binding of the UE 104 from the LAN interface.

In operation 306, the UE 104 may generate and send a DHCP Renew Message to the BNG 116. The UE 104 may generate and send a DHCP Renew Message in response to receiving the DHCP ForceRenew Message 304. If the UE 104 has been hacked or comprised so that it ignores the DHCP ForceRenew Message 304, under the conventional protocol, the UE 104 will send a DHCP Renew Message to the CPE 106 the next time that the UE 104 requests to renew or extend its lease (e.g., half way through the lease period).

In operation block 308, the BNG 116 component may determine whether the UE 104 was identified as an offending host. In an embodiment, the BNG 116 component may determine whether the UE 104 was identified as an offending host based on the UE session policy. In an embodiment, the BNG 116 component may determine whether the UE 104 was identified as an offending host based on a result of comparing the IP/MAC addresses of the UE 104 to the list of offending devices. If the UE 104 was not identified as an offending host, the BNG 116 component may generate a DHCP Offer Message that presents a new IP address assignment for the UE 104 that is within a normal operation range. In such situations, a DHCP Offer Message may simply renew the existing IP/MAC address for the UE 104. In response to determining that UE 104 was identified as an offending host, the BNG 116 component may generate a DHCP Offer Message that presents a new IP/MAC address assignment for the UE 104 that is within the range of IP/MAC addresses included in the preconfigured VACL or layer 2/3 access list (or a blocked IP list, drop IP list, limited IP list, various IP pool list(s), etc.) stored on the CPE 106.

In operation 310, the BNG 116 component may send the DHCP Offer Message to the UE 104 (e.g., via using the CPE 106 for transport, etc.).

In operation 312, the UE 104 may send a DHCP Acknowledge Message to the BNG 116 (e.g., via using the CPE 106 for transport, etc.).

In operation block 314, the system may apply the new DHCP-provided IP/MAC address information to its LAN-facing interface, thereby setting the filtering point on the LAN interface. That is, since the VACL is preexisting on the CPE 106 and the UE 104 has an IP within a certain range (e.g., 'drop,' 'block' or 'limit' range, etc.), the UE traffic will be dropped at the CPE LAN interface. The UE 104 will register that the UE 104 is connected to the CPE 106, but the CPE 106 will drop all communications, including address resolution protocol (ARP) communications for gateway binding, originating from the UE 104.

In some embodiments, the BNG 116 may be further configured to communicate the state (full quarantine, partial quarantine, etc.) of the UE 104 to one or more backoffice systems, and wait for those backoffice systems to instruct the BNG 116 to un-quarantine the UE 104 at the user's request.

Since the filtering point in method 300 is on the LAN interface, all communication to other devices connected to the CPE 106 and/or on the same LAN will be blocked. Thus the UE 104 be completely quarantined, and system will have accomplished total isolation for the offending host (the UE 104).

Said another way, the CPE 106 may be the principal enforcement point in the system. The lists (e.g., layer 2/3 access list, etc.) may exist on both the LAN and WAN interfaces concurrently, and may be the same regardless of their location. The BNG 116 will, in selecting the new layer 3 identity (IP address) of the UE 104, place the UE 104 within a range of IPs that are either filtered at the LAN or WAN interface. When the LAN interface is chosen by the BNG 116 as the filter point, the UE 104 is dead to the network. If on the WAN interface is chosen by the BNG 116 as the filter point, the user will still be able to access the UE 104 via the LAN 102, but the offending UE 104 cannot leave said LAN 102. For example, if the UE 104 is a smart home device that started DDOS'ing the LAN 102, preventing other computers on the LAN 102 from functioning properly, the LAN interface may be chosen by the BNG 116 as the filter point until the smart home device can be replaced (e.g., because smart home devices typically do not allow access to their operating systems, etc.). On the other hand, if the offending UE 104 is a smart lock on the front door of a house that is building IPsec tunnels to a rogue country, isolating it completely from the LAN will prevent people from being able to enter the house. That is, the smart lock needs LAN access, but we don't want it building IPsec tunnels to the rogue country. In this case, the WAN interface may be chosen by the BNG 116 as the filter point.

Figure 4:
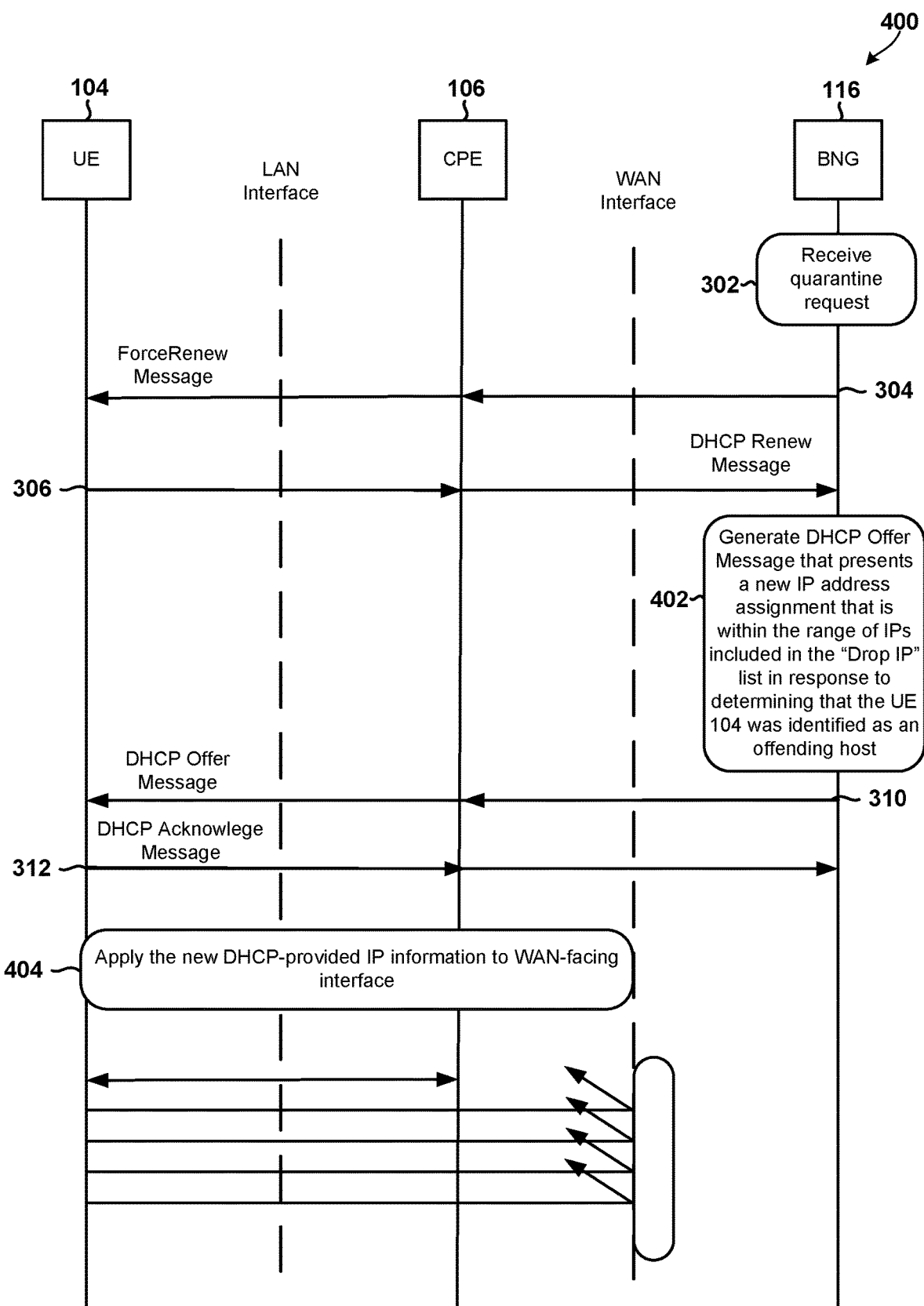
FIG. 4 is a process flow diagram that illustrates a method of filtering network traffic at a WAN interface of a customer premise equipment device in accordance with an embodiment.

FIG. 4 illustrates a method 400 of remotely filtering network traffic at the wide area network interface in accordance with an embodiment. Method 400 may be performed in a network or system that includes a BNG 116 component, a CPE 106 component, and a UE 104 device. In some embodiments, method 400 may be performed after the operations in block 214 illustrated in FIG. 2. The embodiment illustrated in FIG. 4 quarantines an identified offending UE device 104 from a WAN/Internet but may allow the identified offending UE device to still communicate to other devices connected to the same LAN via the CPE.

In operations 302-306 and 310-314, the components may perform the operations discussed above with reference to FIG. 3. In operation 402, the generated DHCP Offer Message that presents a new IP/MAC address assignment that is within the range of IP/MAC addresses included in the "drop IP" list. The drop IP list may be similar to the layer 2/3 access list discussed above with reference to FIG. 3, except that the CPE 106 component will allow connections from IP/MAC address addresses included in the "drop IP" list to continue communicating with other UE devices connected to the LAN interface, but not through the WAN interface.

In operation block 404, the system may apply the new DHCP-provided IP/MAC address information to WAN-facing interface, thereby setting the filtering point on the WAN interface. That is, since the "drop IP" list (or VACL) is preexisting on the CPE 106 and the UE 104 has an IP within a certain range, the UE traffic will be dropped at the CPE WAN interface. As a result, the CPE 106 device will ignore upstream packets or packets having a destination address that is outside of the local area network. Thus the UE 104 be effectively quarantined from the WAN, and system will have isolated the offending host (the UE 104) from the WAN. In some embodiments, the BNG 116 may also communicate the state (e.g., full quarantine, partial quarantine, etc.) of the UE 104 to one or more backoffice systems in operation block 404, and wait for those backoffice systems to instruct the BNG 116 to un-quarantine the UE 104 at the user's request.

Since the filtering point in method 400 is on the WAN interface, the UE 104 will have access to the CPE 106 and other UE devices connected to the LAN via the CPE 106, but not any other device on the Internet or service provider network. This is particularly useful for IoT, smartphone, and M2M devices that do not have a robust user interface, monitor, or keyboard because it allows them to remain accessible via the local network for trouble shooting and rehabilitation.

In some embodiments, when filtering, the CPE/BNG components may facilitate communications to/from external servers (Netflix, Google. Etc) but not 'read' the data as it traverses the system.

Figure 5:
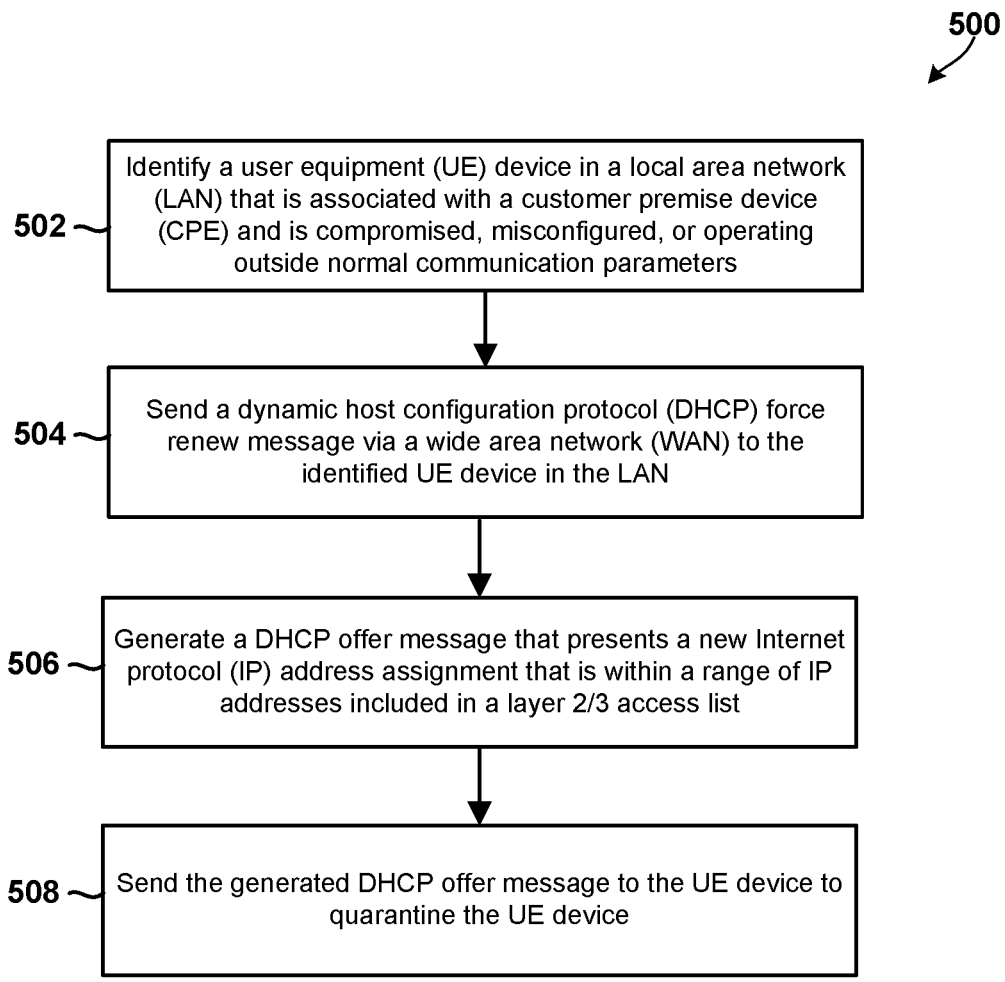
FIG. 5 is a process flow diagram that illustrates a method for performing targeted filtering of network traffic generated by user equipment devices connected to a customer premise device in a communication system that includes a distributed residential gateway in accordance with some embodiments.

FIG. 5 illustrates a method 500 of performing targeted filtering of network traffic generated by UE devices connected to a CPE in a communication system that includes a distributed residential gateway (e.g., implements vCPE or NERG architectures, etc.) in accordance with the embodiments. Method 500 may be performed in a network or system that includes a BNG 116 component, a CPE 106 component, and a UE 104 device. In some embodiments, method 500 may be performed as part of, in conjunction with, or in lieu of the method 200 illustrated in FIG. 2.

The vCPE architecture allows for offloading many of the functions and services of the CPE to the BNG, thereby allowing the CPE to operate as a simple connectivity device, while still providing the end user with the desired/demanded rich and robust feature and service set. While there are many benefits associated with using a vCPE architecture, vCPE architecture does not allow for targeted filtering of host traffic at the CPE component. Rather, within the vCPE architecture, filtering is provided only at the BNG.

In block 502, the BNG component may identify a UE device in a LAN that is associated with the CPE, and which is compromised, misconfigured, or operating outside normal communication parameters. The functions of the CPE (e.g., DHCP server function, a packet filter function, etc.) may be distributed between a BRG at a customer premise (home network, LAN, etc.) and a BNG in a service provider network. In some embodiments, the CPE may be configured or allowed to operate as a simple connectivity device.

In block 504, the BNG component may send a dynamic host configuration protocol (DHCP) force renew message via a WAN to the identified UE device in the LAN. In block 506, the BNG component may generate a DHCP offer message that presents a new IP address assignment that is within a range of IP addresses included in a layer 2/3 access list. In various embodiments, layer 2/3 access list may include (or may be) a layer 2 access list, a layer 3 access list, a blocked IP list, a drop IP list, etc.

In block 508, the BNG component may send the generated DHCP offer message to the UE device to quarantine the UE device. By generating and sending the DHCP offer message to the UE device in block 506 and 508, the embodiments utilize the vCPE or distributed residential gateway architecture, yet allow targeted filtering of host traffic at the CPE for complete or partial host isolation at the LAN and/or WAN interface. That is, in an aspect, sending the generated DHCP offer message to the UE device in block 508 may quarantine the UE device at a LAN-interface of the CPE and/or accomplish targeted filtering of host traffic at the CPE for complete host isolation. In another aspect, sending the generated DHCP offer message to the UE device in block 508 may quarantine the UE device at a WAN-interface of the CPE and/or accomplish targeted filtering of host traffic at the CPE for partial host isolation.

By utilizing the vCPE distributed residential gateway architecture, the various embodiments allow for the rapid deployment of new features or services at the customer premises without requiring complex software or expensive hardware on the CPEs. By allowing targeted filtering of host traffic at the CPE, the various embodiments allow for isolating a specific host without negatively impacting all the devices within the device's LAN or home network.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 200, 300, and 400 may be substituted for or combined with one or more operations of the methods 200, 300, and 400, and vice versa.

Figure 6:
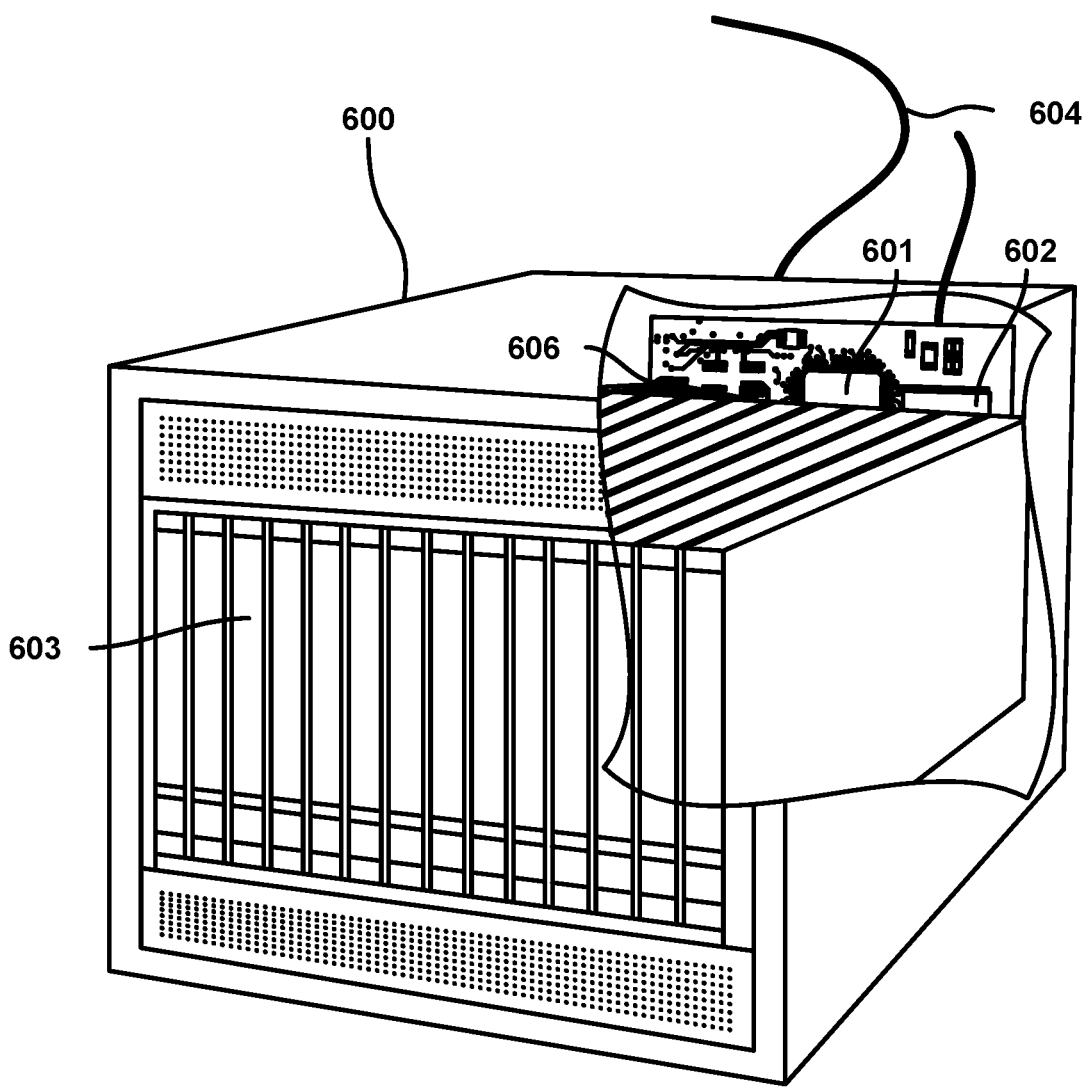
FIG. 6 is a component diagram of an example server suitable for implementing the various embodiments.

Various embodiments (including, but not limited to, embodiments discussed above with reference to FIGS. 1B-5) may be implemented on any of a variety of commercially available computing devices, such as the server computing device 600 illustrated in FIG. 6. Such a server device 600 may include a processor 601 coupled to volatile memory 602 and a large capacity nonvolatile memory, such as a disk drive 603. The server device 600 may also include a floppy disc drive, USB, compact disc (CD) or DVD disc drive coupled to the processor 601. The server device 600 may also include network access ports 606 coupled to the processor 601 for establishing data connections with a network connection circuit 604 and a communication network (e.g., IP network) coupled to other communication system network elements.

The processors discussed in this application may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the device and memory within the processors themselves. Additionally, as used herein, any reference to a memory may be a reference to a memory storage and the terms may be used interchangeably.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for performing targeted filtering of network traffic generated by user equipment (UE) devices connected to a customer premise equipment (CPE) device in a communication system that includes a distributed residential gateway, the method comprising:
    determining, by the processor in a computing device, whether there is a preconfigured virtual local area network access control list (VACL) on the CPE device that lists source internet protocol (IP) addresses from which the CPE device will filter outbound traffic in response to determining that the UE device is a RFC 3203 compliant device connected to the CPE device in a home network;
    generating, by the processor in the computing device, a quarantine request message that includes at least one of an IP address or a media access control (MAC) address of the UE device in response to determining that the preconfigured VACL on the CPE device lists source IP addresses from which the CPE device will filter outbound traffic; and
    sending, by the processor in the computing device, the generated quarantine request message to a bridged residential gateway (BRG) associated with the CPE device.

2. The method of claim 1, wherein the computing device is included in a security, mediation, control, identification, tracking or trending system.

3. The method of claim 1, wherein the computing device implements a broadband network gateway (BNG) component.

4. The method of claim 1, wherein determining whether there is the preconfigured VACL on the CPE device that lists source IP addresses from which the CPE device will filter outbound traffic in response to determining that the UE device is the RFC 3203 compliant device connected to the CPE device in the home network comprises:
    determining whether the preconfigured VACL on the CPE device lists source IP addresses from which the CPE device will restrict, block, or drop outbound traffic in response to determining that the UE device is the RFC 3203 compliant device connected to the CPE device in the home network.

5. The method of claim 1, wherein determining whether there is the preconfigured VACL on the CPE device that lists source IP addresses from which the CPE device will filter outbound traffic in response to determining that the UE device is the RFC 3203 compliant device connected to the CPE device in the home network comprises:
    determining whether the CPE device includes at least one or more of a blocked IP list, a drop IP list, a restricted IP list, a layer 2 access list, a layer 3 access list, a layer 2/3 access list, an in-home only access list, a local area network (LAN) filter list, or a wide area network (WAN) filter list in response to determining that the UE device is the RFC 3203 compliant device connected to the CPE device in the home network.

6. The method of claim 5, further comprising receiving a confirmation message indicating that the UE device has been quarantined by assigning the UE device the IP address from at least one or more of the blocked IP list, the drop IP list, the restricted IP list, the layer 2 access list, the layer 3 access list, the layer 2/3 access list, the in-home only access list, the LAN filter list, or the WAN filter list.

7. The method of claim 1, wherein determining whether there is the preconfigured VACL on the CPE device that lists source IP addresses from which the CPE device will filter outbound traffic in response to determining that the UE device is the RFC 3203 compliant device connected to the CPE device in the home network comprises:
    determining whether the CPE device includes a layer 2/3 access list that identifies a range of IPs for which layer 2 or 3 communications with other UE devices connected to a local area network (LAN) interface will be prevented in response to determining that the UE device is the RFC 3203 compliant device connected to the CPE device in the home network.

8. The method of claim 1, wherein determining whether there is the preconfigured VACL on the CPE device that lists source IP addresses from which the CPE device will filter outbound traffic in response to determining that the UE device is the RFC 3203 compliant device connected to the CPE device in the home network comprises:
    determining whether the CPE device includes a drop IP list that identifies a range of IPs for which layer 2 or 3 communications with other UE devices connected to a local area network (LAN) interface will be allowed and layer 2 and 3 communications with other UE devices connected to a wide area network (WAN) interface will be prevented in response to determining that the UE device is the RFC 3203 compliant device connected to the CPE device in the home network.

9. The method of claim 1, further comprising receiving a confirmation message indicating that the UE device has been at least one or more of:
    quarantined at a local area network (LAN) interface of the CPE device; or
    quarantined at a wide area network (WAN) interface of the CPE device.

10. A server computing device, comprising:
    a processor configured with processor-executable instructions to:
        determine whether there is a preconfigured virtual local area network access control list (VACL) on a CPE device that lists source internet protocol (IP) addresses from which the CPE device will filter outbound traffic in response to determining that a UE device is a RFC 3203 compliant device connected to the CPE device in a home network;
        generate a quarantine request message that includes at least one of an IP address or a media access control (MAC) address of the UE device in response to determining that the preconfigured VACL on the CPE device lists source IP addresses from which the CPE device will filter outbound traffic; and
        send the generated quarantine request message to a bridged residential gateway (BRG) associated with the CPE device.

11. The server computing device of claim 10, wherein the server computing device is included in a security, mediation, control, identification, tracking or trending system.

12. The server computing device of claim 10, wherein the processor is further configured to implement a broadband network gateway (BNG) component.

13. The server computing device of claim 10, wherein the processor is configured to determine whether there is the preconfigured VACL on the CPE device that lists source IP addresses from which the CPE device will filter outbound traffic in response to determining that the UE device is the RFC 3203 compliant device connected to the CPE device in the home network by determining whether there is the preconfigured VACL on the CPE device that lists source IP addresses from which the CPE device will restrict, block, or drop outbound traffic in response to determining that the UE device is a RFC 3203 compliant device connected to the CPE device in a home network.

14. The server computing device of claim 10, wherein the processor is configured to determine whether there is the preconfigured VACL on the CPE device that lists source IP addresses from which the CPE device will filter outbound traffic in response to determining that the UE device is the RFC 3203 compliant device connected to the CPE device in the home network by determining whether the CPE device includes at least one or more of a blocked IP list, a drop IP list, a restricted IP list, a layer 2 access list, a layer 3 access list, a layer 2/3 access list, an in-home only access list, a local area network (LAN) filter list, or a wide area network (WAN) filter list in response to determining that the UE device is a RFC 3203 compliant device connected to the CPE device in a home network.

15. The server computing device of claim 14, wherein the processor is configured to determine whether there is the preconfigured VACL on the CPE device that lists source IP addresses from which the CPE device will filter outbound traffic in response to determining that the UE device is the RFC 3203 compliant device connected to the CPE device in the home network by assigning the UE device the IP address from at least one or more of the blocked IP list, the drop IP list, the restricted IP list, the layer 2 access list, the layer 3 access list, the layer 2/3 access list, the in-home only access list, the LAN filter list, or the WAN filter list.

16. The server computing device of claim 10, wherein the processor is configured to determine whether there is the preconfigured VACL on the CPE device that lists source IP addresses from which the CPE device will filter outbound traffic in response to determining that the UE device is the RFC 3203 compliant device connected to the CPE device in the home network by determining whether the CPE device includes a layer 2/3 access list that identifies a range of IPs for which layer 2 or 3 communications with other UE devices connected to a local area network (LAN) interface will be prevented in response to determining that the UE device is a RFC 3203 compliant device connected to the CPE device in a home network.

17. The server computing device of claim 10, wherein the processor is configured to determine whether there is the preconfigured VACL on the CPE device that lists source IP addresses from which the CPE device will filter outbound traffic in response to determining that the UE device is the RFC 3203 compliant device connected to the CPE device in the home network by determining whether the CPE device includes a drop IP list that identifies a range of IPs for which layer 2 or 3 communications with other UE devices connected to a local area network (LAN) interface will be allowed and layer 2 and 3 communications with other UE devices connected to a wide area network (WAN) interface will be prevented in response to determining that the UE device is a RFC 3203 compliant device connected to the CPE device in a home network.

18. The server computing device of claim 10, wherein the processor is further configured to receive a confirmation message indicating that the UE device has been at least one or more of:
quarantined at a local area network (LAN) interface of the CPE device; or
quarantined at a wide area network (WAN) interface of the CPE device.

19. A non-transitory computer readable storage medium having stored thereon processor-executable software instructions configured to cause a server processor to perform operations for accomplishing targeted filtering of network traffic generated by user equipment (UE) devices connected to a customer premise equipment (CPE) device in a communication system that includes a distributed residential gateway, the operations comprising:
determining whether there is a preconfigured virtual local area network access control list (VACL) on the CPE device that lists source internet protocol (IP) addresses from which the CPE device will filter outbound traffic in response to determining that the UE device is a RFC 3203 compliant device connected to the CPE device in a home network;
generating a quarantine request message that includes at least one of an IP address or a media access control (MAC) address of the UE device in response to determining that the preconfigured VACL on the CPE device lists source IP addresses from which the CPE device will filter outbound traffic; and
sending the generated quarantine request message to a bridged residential gateway (BRG) associated with the CPE device.

20. The non-transitory computer readable storage medium of claim 19, wherein the server processor is included in a security, mediation, control, identification, tracking or trending system.

21. The non-transitory computer readable storage medium of claim 19, wherein the server processor is included a computing device that implements a broadband network gateway (BNG) component.

22. The non-transitory computer readable storage medium of claim 19, wherein the stored processor-executable software instructions are configured to cause a processor to perform operations such that determining whether there is a preconfigured VACL on the CPE device that lists source IP addresses from which the CPE device will filter outbound traffic in response to determining that the UE device is the RFC 3203 compliant device connected to the CPE device in the home network comprises determining whether there is the preconfigured VACL on the CPE device that lists source IP addresses from which the CPE device will restrict, block, or drop outbound traffic in response to determining that the UE device is the RFC 3203 compliant device connected to the CPE device in the home network.

23. The non-transitory computer readable storage medium of claim 19, wherein the stored processor-executable software instructions are configured to cause a processor to perform operations such that determining whether there is a preconfigured VACL on the CPE device that lists source IP addresses from which the CPE device will filter outbound traffic in response to determining that the UE device is the RFC 3203 compliant device connected to the CPE device in the home network comprises determining whether the CPE device includes at least one or more of a blocked IP list, a drop IP list, a restricted IP list, a layer 2 access list, a layer 3 access list, a layer 2/3 access list, an in-home only access list, a local area network (LAN) filter list, or a wide area network (WAN) filter list in response to determining that the UE device is the RFC 3203 compliant device connected to the CPE device in the home network.

24. The non-transitory computer readable storage medium of claim 23, wherein the stored processor-executable software instructions are configured to cause a processor to perform operations further comprising receiving a confirmation message indicating that the UE device has been quarantined by assigning the UE device the IP address from at least one or more of the blocked IP list, the drop IP list, the restricted IP list, the layer 2 access list, the layer 3 access list, the layer 2/3 access list, the in-home only access list, the LAN filter list, or the WAN filter list.

25. The non-transitory computer readable storage medium of claim 24, wherein the stored processor-executable software instructions are configured to cause a processor to perform operations such that determining whether there is the preconfigured VACL on the CPE device that lists source IP addresses from which the CPE device will filter outbound traffic comprises determining whether the CPE device includes a layer 2/3 access list that identifies a range of IPs for which layer 2 or 3 communications with other UE devices connected to a local area network (LAN) interface will be prevented in response to determining that the UE device is the RFC 3203 compliant device connected to the CPE device in the home network.

26. The non-transitory computer readable storage medium of claim 19, wherein the stored processor-executable software instructions are configured to cause a processor to perform operations such that determining whether there is the preconfigured VACL on the CPE device that lists source IP addresses from which the CPE device will filter outbound traffic comprises determining whether the CPE device includes a drop IP list that identifies a range of IPs for which layer 2 or 3 communications with other UE devices connected to a local area network (LAN) interface will be allowed and layer 2 and 3 communications with other UE devices connected to a wide area network (WAN) interface will be prevented in response to determining that the UE device is the RFC 3203 compliant device connected to the CPE device in the home network.

27. The non-transitory computer readable storage medium of claim 19, wherein the stored processor-executable software instructions are configured to cause a processor to perform operations further comprising receiving a confirmation message indicating that the UE device has been at least one or more of:
quarantined at a local area network (LAN) interface of the CPE device; or
quarantined at a wide area network (WAN) interface of the CPE device.

* * * * *